(12) United States Patent
Woolfson

(10) Patent No.: US 7,342,651 B1
(45) Date of Patent: Mar. 11, 2008

(54) TIME MODULATED DOUBLET COHERENT LASER RADAR

(75) Inventor: Martin G. Woolfson, Baltimore, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 274 days.

(21) Appl. No.: 11/117,465

(22) Filed: Apr. 29, 2005

Related U.S. Application Data

(60) Provisional application No. 60/638,403, filed on Dec. 27, 2004.

(51) Int. Cl.
*G01P 3/36* (2006.01)

(52) U.S. Cl. .......................................... 356/28; 356/28.5

(58) Field of Classification Search .................... 356/28
See application file for complete search history.

(56) References Cited

U.S. PATENT DOCUMENTS

| | | | |
|---|---|---|---|
| 5,155,542 A * | 10/1992 | Rampolla et al. | 356/5.01 |
| 5,815,250 A | 9/1998 | Thomson et al. | |
| 2006/0139620 A1 * | 6/2006 | Hopwood et al. | 356/5.15 |

* cited by examiner

*Primary Examiner*—Thomas H. Tarcza
*Assistant Examiner*—Luke D. Ratcliffe
(74) *Attorney, Agent, or Firm*—Andrews Kurth LLP

(57) ABSTRACT

The time separation of laser pulses comprised of a relatively fixed reference pulse and a time varying doublet pulse in a doublet pulse laser radar is linearly modulated for eliminating velocity ambiguity upon reception and detection. A range-Doppler map can be directly generated which not only reveals target range and velocity, but also can be processed to indicate target motion, such as rotation.

18 Claims, 6 Drawing Sheets

$\Delta\phi = 4\pi V \tau / \lambda$

TIME MODULATED DOUBLET COHERENT LASER RADAR

PRIORITY

This application claims priority of Provisional application No. 60/638,403, filed in the United States Patent and Trademark Office on Dec. 27, 2004.

BACKGROUND OF THE INVENTION

1. Field of the Invention

This invention relates generally to laser radar systems and more particularly to a time modulated doublet coherent laser radar system.

2. Description of Related Art

Radar systems utilizing doublet RF pulse waveforms are generally known, being used, for example, in Doppler radar applications. Moreover, pulse pairs having constant time separation between the transmitted pulses and polypulse transmit formats have been utilized in radar systems for meteorological systems where weather echoes are probed for radio velocity and spectral width. Doublet pulse applications at optical wavelengths have not been used until recently because the frequency and phase of the transmitted waveform typically varies from one doublet pulse pair to the next, i.e., doublets are coherent from pulse to pulse but not doublet to doublet. However, this problem has recently been overcome, for example, by the generation and inclusion of a monitor pulse which comprises a portion of each pulse of the doublet pair transmitted and is then used as a reference during signal processing to remove the effects of fluctuations in frequency and phase of the transmitted pulse waveforms to provide measurements of range and velocity. Such a system is disclosed, for example, in U.S. Pat. No. 5,815,250, Doublet Pulse Coherent Laser Radar For Precision Range and Velocity Measurements, Thomson et al., Sep. 29, 1998.

SUMMARY OF THE INVENTION

It is an object of the invention to provide an improvement in laser radar (ladar) systems.

It is another object of the invention to provide a laser radar system which is usable for space applications.

It is a further object of the present invention to provide an improvement in range and velocity measurements by a coherent laser radar system.

It is yet a further object of the present invention to provide a coherent laser radar system which in addition to providing range and velocity measurements at megameter distances, is capable of providing measurement of target motions such as rotation.

These and other objects are achieved in the present invention by a method and apparatus for time modulating the separation of the doublet pulses including a relatively fixed reference pulse and a time varying doublet pulse. Sets of doublet optical laser pulses are generated, transmitted and subsequently received from a target by a laser radar which unlike RF radar, does not provide a series of pulses having coherent outputs. The doublet separation of each pair, moreover, is linearly varied by a predetermined substantially equal amount on each successive doublet or sets of like doublets eliminating velocity ambiguity which is determined by the incremental pulse separation between the pulse pair whereby each step reduces velocity error. A range-Doppler map can be directly generated, which not only reveals target range and velocity, but also can be processed by Fourier compression to indicate target translation or motion, such as rotation. Fourier compression can be performed on the target return data since the phase of each doublet is advanced linearly.

Further scope of applicability of the present invention will become apparent from the detailed description provided hereinafter. It is should be understood, however, that the detailed description and specific examples, while indicating the preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings which are provided by way of illustration only, and thus are not meant to limit the subject invention, and wherein.

DETAILED DESCRIPTION OF THE INVENTION

Figure 1:
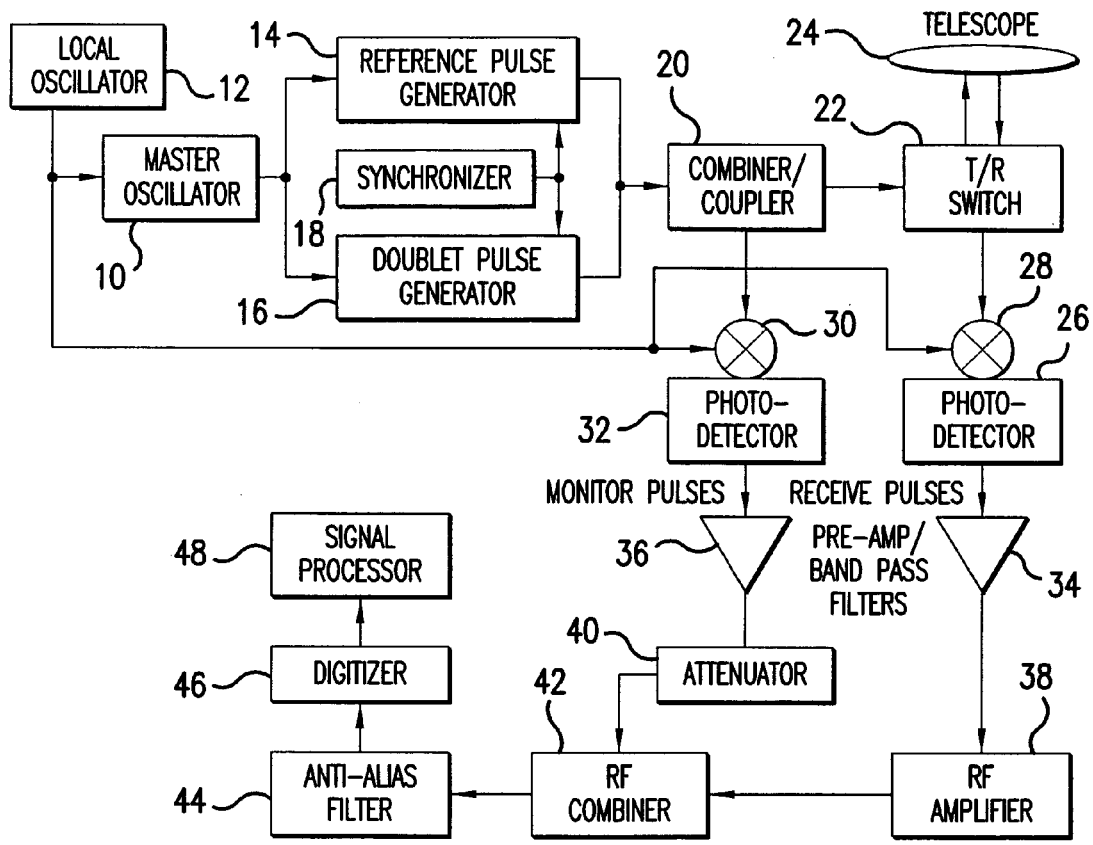
FIG. 1 is a block diagram illustrative of a doublet pulse laser radar system in accordance with the preferred embodiment of the subject invention.
Figure 2:
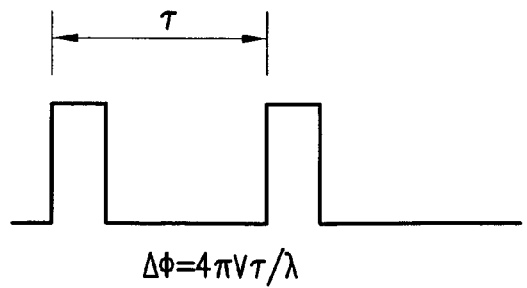
FIG. 2 is a diagram illustrative of a doublet pulse waveform.
Figure 3:
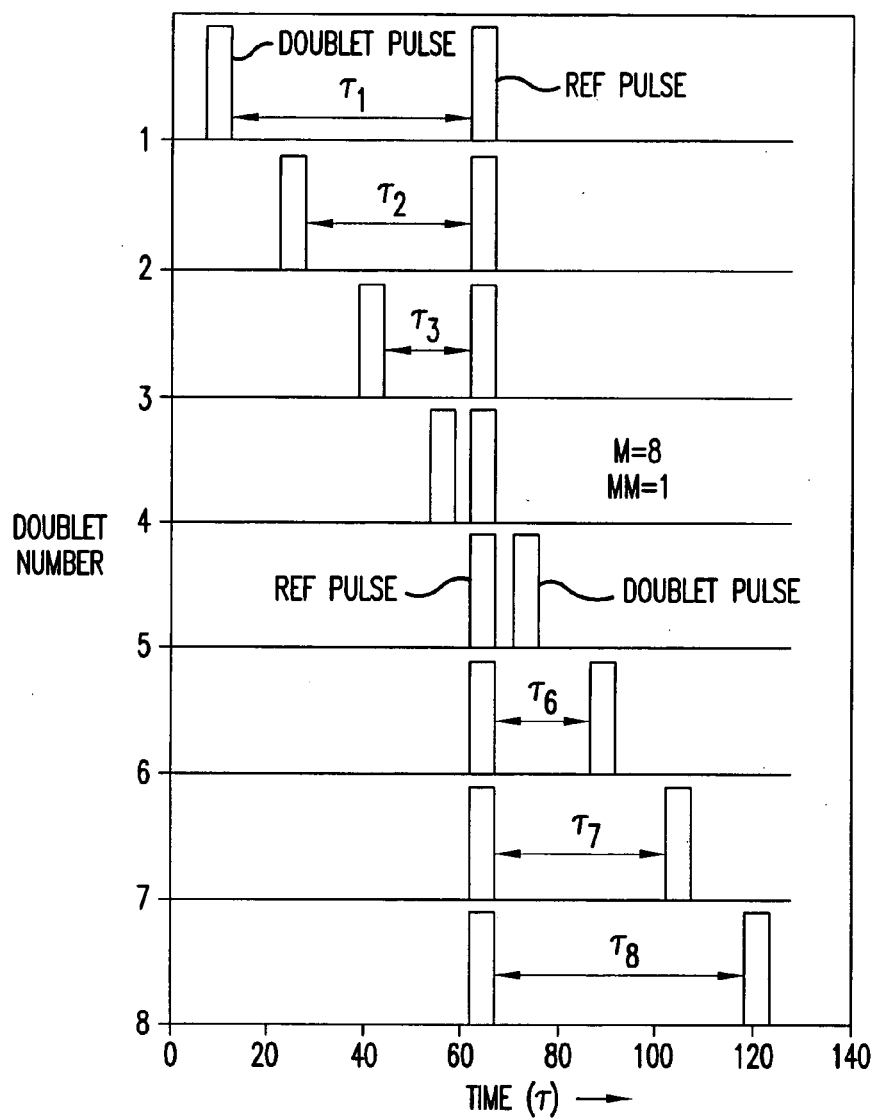
FIG. 3 is a diagram illustrative of time modulation of doublet pulses in accordance with the preferred method of the subject invention.
Figure 4:
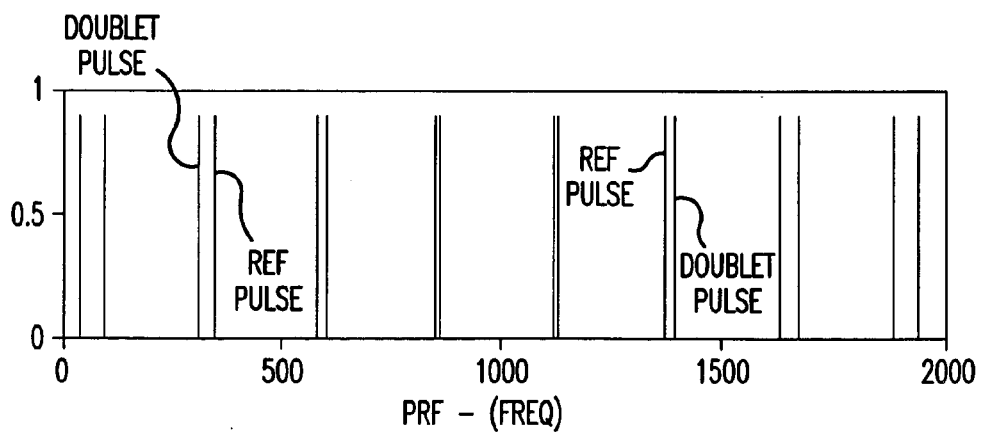
FIG. 4 is another diagram further illustrative of a set of time modulated doublet pulses such as shown in FIG. 3.

Referring now to the drawings wherein like reference numerals refer to like components throughout, FIG. 1 is a block diagram illustrative of a dual pulse laser radar system in accordance with the subject invention which transmits and receives time modulated doublet pulses to and from a target having a time separation or spacing τ as shown in FIG. 2 and which are varied in linear time increments as shown in FIGS. 3 and 4. In FIG. 3, each doublet of M=8 pairs of doublets includes a reference pulse and a doublet pulse, with the doublet pulse having its time relationship change with respect to a constant location of the reference pulse. For example, in FIG. 3 the doublet pulse in the first time interval begins before the reference pulse (negative spacing) and advances linearly in time until it eventually occurs after the reference pulse (positive spacing). The negative to positive spacing is used in order to limit the peak difference in the doublet spacing. FIG. 4 is illustrative of a system as shown in FIG. 3 also having a variable pulse repetition rate (prf).

Figure 5:
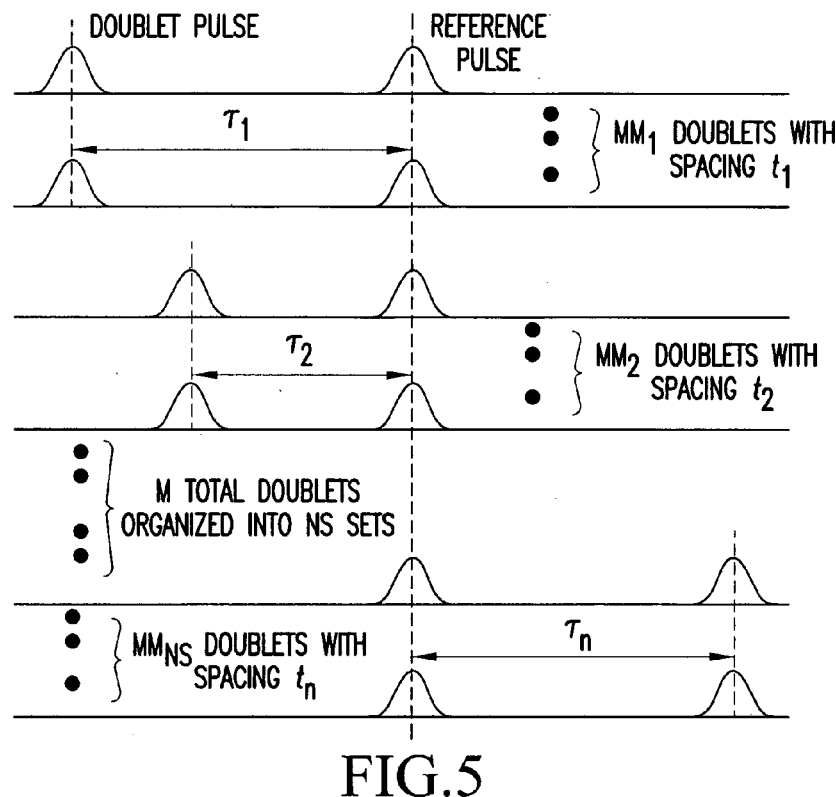
FIG. 5 is a diagram illustrative of time modulated doublet pulses consisting of sets of doublets having the same doublet spacing.

While FIGS. 3 and 4 illustrate one doublet pair for each time interval, FIG. 5 is intended to illustrate that, when desired, sets of equally spaced doublets can be transmitted and received in successive linear time intervals to improve performance, as will be shown hereinafter.

The apparatus for generating these waveforms is shown in FIG. 1 and includes two laser pulse sources, a master optical pulse oscillator 10, and a local optical pulse oscillator 12 whose frequencies are offset relative to one another. A reference pulse generator 14 and a doublet pulse generator 16 is shown coupled to the output of the master oscillator 10. The reference pulse generator 14 and the double pulse generator 16 respectively output time related mutually separated optical pulses under the control of a synchronizer 18 as shown, for example, in FIG. 2. At least one reference pulse and one doublet pulses separated by a predetermined time modulated spacing, and preferably a linear time modulated spacing, are respectively fed from the reference pulse generator 14 and the doublet pulse generator 16 to a combiner/coupler 20 which form a doublet pulse pair as shown in FIG. 3. Each doublet pair is connected to a transmit/receive (T/R) switch 22, where they are transmitted and received from a target, not shown, via a telescope 24 in the same fashion that an RF radar system transmits and receives RF signal pulses from an antenna.

It is to be noted that when a target is acquired and being tracked, the pulse spacing or phase (Doppler shift) between the respective pulses of the transmitted doublets and the rotation or received doublets changes. This phase change is also a function of target velocity.

The received doublet pulse pairs consisting of a reference pulse and a return doublet pulse returns are coherently detected by a photodetector 26 by optically adding a portion of the signal from the local oscillator 12 to the pulse return signals in an optical mixer 28. The local oscillator 12 is used to shift the carrier frequency of the doublet pulses on return so as to approximate target velocity and to be within the bandwidth of the receiver circuitry. The pulse doublet pairs of optical signals are also fed from the combiner/coupler 20 to a second optical mixer 30 along with the same signal from the local oscillator 12 fed to the mixer 28, so as to provide the same frequency offset of transmitted signals to a second photodetector 32. The second photodetector 32 generates monitor pulses which are used for phase comparison similar to that as shown and described in U.S. Pat. No. 5,815,250 to remove the effects of fluctuations in frequency and phase of the transmitted pulses.

The photodetectors 26 and 28 comprise square law detectors. The photodetectors output signals which are fed to respective pre-amp/bandpass filters 34 and 36 which respectively output signals at the difference frequency between the transmit frequency of the master oscillator 10 and the associated Doppler shift in the return pulse and the frequency of the local oscillator 12. It should be noted that phase is also preserved in the detection process. It should be pointed out that the relative phase between the pulse doublets of each pair is preserved, although the phase relationship of previous and subsequent pulse doublet pairs are not phase coherent with the instant pulse doublets. This can be demonstrated by the following.

For a difference velocity v, a wavelength λ, a time change Δτ, the phase change Δf between pulses of a doublet pair can be expressed as shown in FIG. 2, as:

$$\Delta f = 4\pi v \Delta \tau / \lambda \quad (1)$$

For a fixed doublet spacing, the velocity ambiguity interval Va is:

$$Va = 1/2\Delta\tau, \quad (2)$$

For M doublets, m=0 . . . M−1 the spacing τ(m) of the doublets is linearly varied according to the expression:

$$\tau m = [m-(M-1)/2] \times \Delta\tau, \quad (3)$$

a phase change Δf results which can be expressed as:

$$\Delta f(m) = 4\pi v \tau(m)/\lambda \quad (4)$$

Thus it can be seen that phase shift Δf for any doublet m is not only proportional to velocity v, but also to the doublet interval τ.

By sampling the data in time (or range) at a particular range sample, and taking the Fast Fourier Transform (FFT) of the resultant sample vector, the resultant spectrum can be shown to peak at a velocity v which is the difference velocity.

Figure 7:
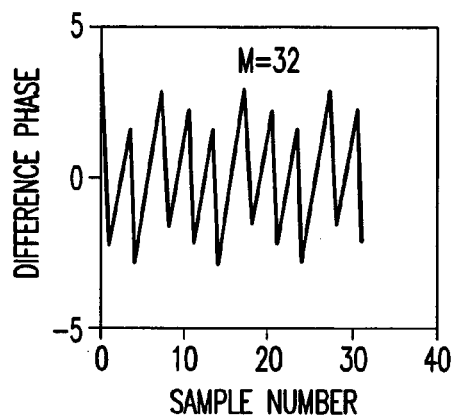
FIGS. 7, 8 and 9 are graphs illustrative of the operational characteristic of a time modulated doublet laser radar system such as shown in FIG. 1.
Figure 8:
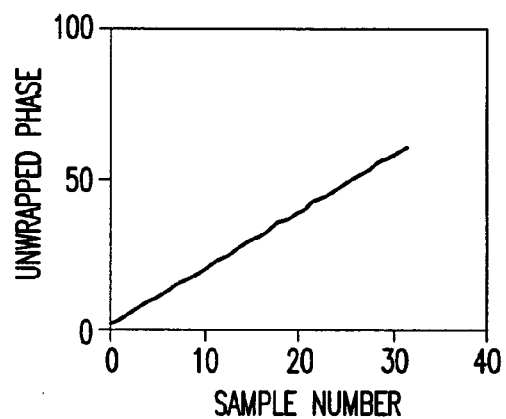
Figure 9:
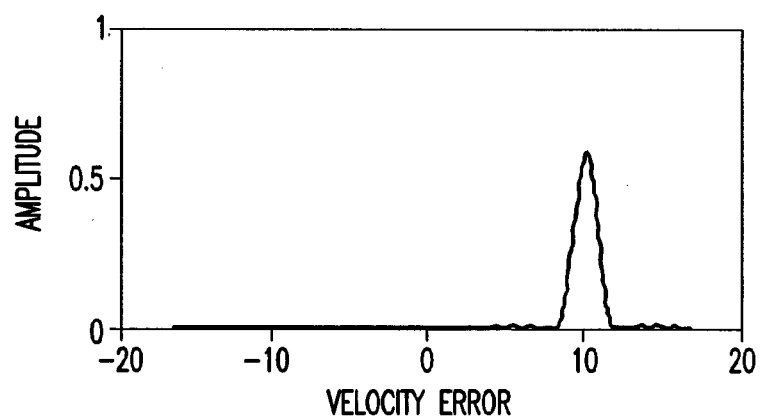

An example of this phenomenon can be demonstrated by reference to FIGS. 7, 8 and 9, where v=10 m/sec., λ=1.064 microns, and Δτ=16 nanoseconds. The FFT of the signal is shown in FIG. 9. There the resultant spectrum peaks at a difference velocity or velocity error of 10 m/sec.

Figure 6:
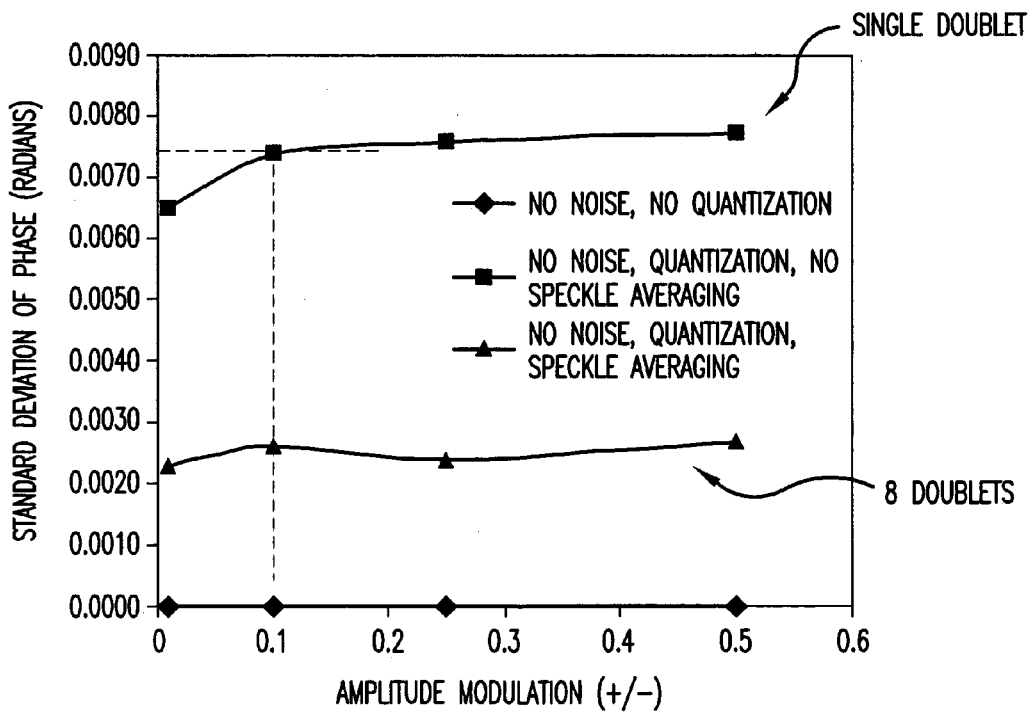
FIG. 6 is a graph illustrative of the improvement in phase deviation achieved with multiple doublets having the same spacing such as shown in FIG. 5.

While FIGS. 3 and 4 depict one doublet pulse pair for each time interval between $\tau_1$ and $\tau_8$, FIG. 5 is illustrative of multiple double pulse pairs for each time interval $\tau_1$, $\tau_2$ . . . $\tau_n$. Multiple doublets for each time spacing results in a lowering of the standard deviation of phase or modulation error as shown in FIG. 6. This results because more than one set of doublets is being used in an averaging technique which is referred to as speckle averaging.

Referring back to FIG. 1, the detected return pulses of a transmitted doublet pair are fed from the pre-amp bandpass filter 34 to an RF amplifier 38 while doublet monitor pulses from the bandpass filter 36 are fed to a signal attenuator 40 so as to provide received and monitored pulses of substantially the same amplitude when fed to an RF signal combiner 42. Combined RF signal pulses consisting of receive and monitor doublet pulse pairs are fed to an anti-alias filter 44 and then to a digitizer (analog-to-digital signal converter) 46. Digital signals of the combined monitor and receive pulses are next, fed to a signal processor 48 where a range-Doppler map as shown in FIG. 4 is generated for detecting translation or motion, e.g., rotation, of a target from the return doublet pair signals.

Figure 10:
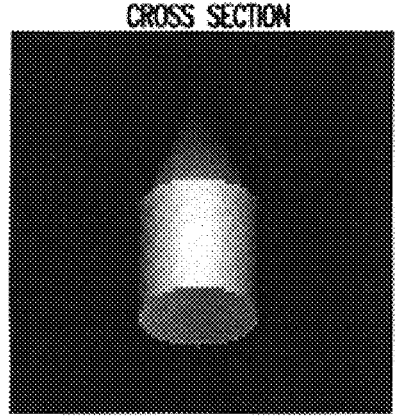
FIG. 10 is a drawing illustrative of the pixels of a cross section of a target object associated with a particular range and velocity as measured along the line of sight by of the laser radar shown in FIG. 1.
Figure 11:
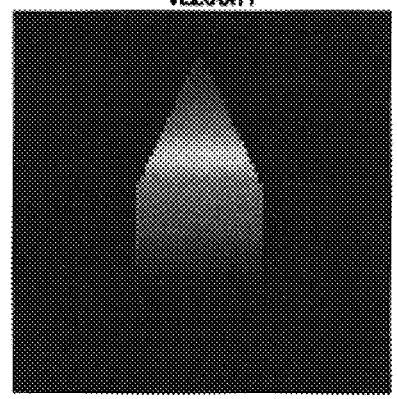
FIG. 11 is illustrative of the pixels of the cross section shown in FIG. 10 associated with the same velocity of the target object shown in FIG. 10 as measured along the line of sight.
Figure 12:
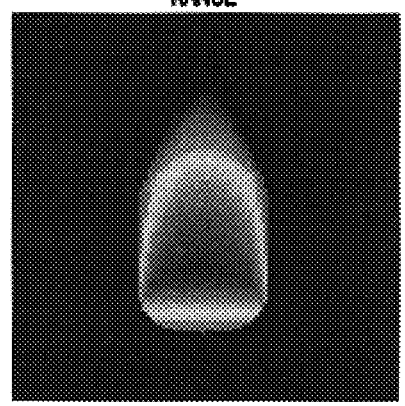
FIG. 12 is illustrative of the pixels of the cross section shown in FIG. 10 associated with the same range of the target object shown in FIG. 10 as measured along the line of sight.
Figure 13:
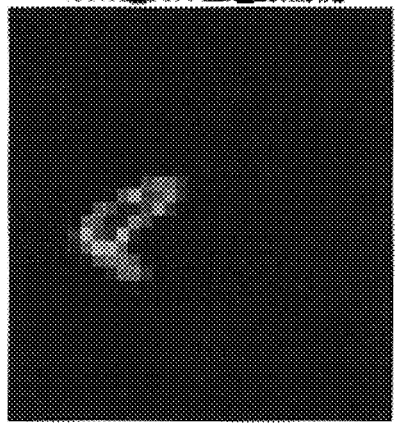
FIG. 13 is a pictorial illustration of a map of the range Doppler estimate produced during signal processing.
Figure 14:
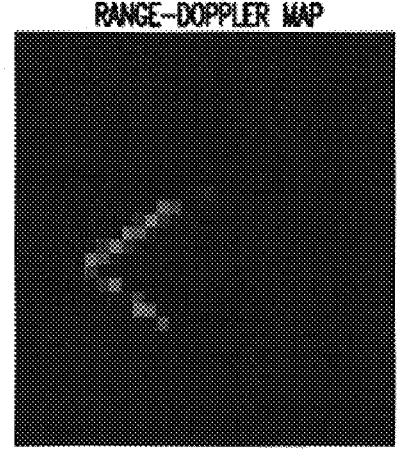
FIG. 14 is a diagram illustrative of a range Doppler map of a target shown in FIG. 11 of the accumulated intensity values which occur at a particular range with different velocity values.

The formation of the range-Doppler map begins with a determination of the reflectance values of a cross section of the target object, for example, as shown in FIG. 10 as viewed along the line-of-sight (LOS) of the ladar. For each pixel in the cross-section, representation is associated with a particular range and a particular velocity as measured along the LOS as shown in FIGS. 11 and 12. An estimate range Doppler map is generated by signal processing as shown in FIG. 13, from which a range Doppler map is formed, as shown in FIG. 14, which depicts the accumulated intensity values which occur at a particular range and move with a given velocity. In this example, there are points on the target object which occur at the same range with different velocity values of the target signifying rotation of the target. For a non-rotating target, the range-Doppler map collapses to a line. Summing over velocity yields a range profile and summing over range yields a velocity profile.

Figure 15:
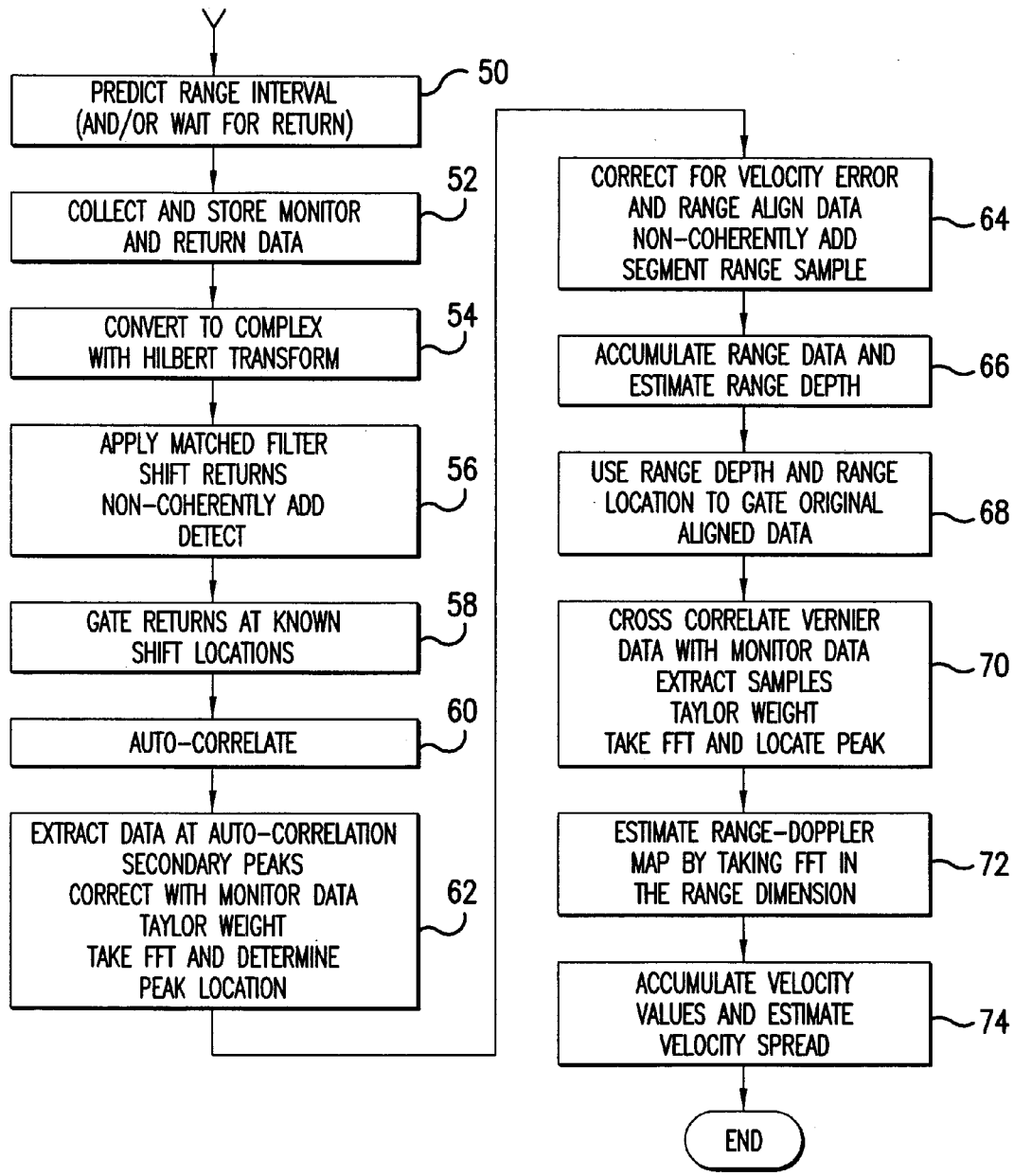
FIG. 15 is a flow diagram illustrative of the signal processing implemented in the subject invention.

Considering now signal processing with respect to the time modulated doublet signals, reference is now made to FIG. 15. As shown in FIG. 15, the first step in the signal processing of the sets of return doublet pulses occurring sequentially in linear fashion is an original estimate or prediction of range of the first set of doublets that is made as shown by reference numeral 50. The range is estimated from the time or phase delay between the peak of an outgoing doublet pulse and the peak of the envelope of the return of the same doublet pulse and can be obtained from the photodetector 26 of the received pulses. This is due to the fact that the phase difference is directly related to the change in relative distance or range between the target and the laser radar system.

The next step involves collecting and storing the subsequent monitor and return pulse data fed into the signal processor 50. This is indicated by reference numeral 52.

Typical radar processing is based on the utilization of complex (I and Q) data. The data from the photo-detectors 26 and 32 are converted to complex form using the well known Hilbert transform, providing a complex envelope as shown by reference numeral 54. All the returns are next applied to a matched filter in order to reduce noise. The filter is matched to the generic complex envelope of the transmitted pulse. The known timing intervals of the doublets are exploited to perform a non-coherent addition of the filter returns as indicated by step 56. Next, returns of several doublets at known shift locations are gated out and are autocorrelated as shown by reference numerals 58 and 60.

Data is then extracted at the autocorrelation secondary peaks which is then corrected with monitor data using Taylor weighting. This is followed by taking a Fast Fourier Transform (FFT) of the data as indicated by step 62 which provides an estimate of frequency error at the peak location. An ideal example is shown in FIG. 9.

The next step 64 is to correct for velocity error (FIG. 11?) and then range align the data by non-coherently adding segment range samples as shown by step 66. Range data is accumulated and range depth is estimated per step 68. Using range depth and range location, the original aligned data is per step 68 is gated out and a cross correlation is carried out with monitor data. Samples of the cross correlated data are extracted, Taylor weighted, and an FFT is taken to locate the peak as shown by reference numeral 70. An estimate range-Doppler map as shown in FIG. 13 is next formed by taking an FFT in the range dimension as shown by step 72. Finally, velocity values are accumulated from the estimate range-Doppler map of FIG. 13 and an estimated velocity spread is computed per step 74.

Thus what has been shown and described herein is a scheme by which the normally fixed spacing doublet radar method can be enhanced by time modulating the doublet spacing so as to permit conventional radar processing to be performed on the output of a ladar system which, unlike radar, does not produce a series of coherent outputs. In the present invention, a 'pseudo-coherent' process is formed by inducing a linear change in phase with time which can be processed with spectral analysis methods.

Having thus shown and described what is at present considered to be the preferred method and embodiment of the invention, it is to be noted that alterations and changes coming within the spirit and scope of the invention as set forth in the appended claims are herein meant to be included.

What is claimed is:

1. A method of operating a doublet pulse optical radar system, comprising:
   generating pairs of doublet optical pulse radar signals of electromagnetic energy, each of said pairs of doublet optical pulse radar signals including a reference pulse and a doublet pulse spaced apart in time relative to the reference pulse; and
   varying the spacing between the reference pulse and the respective doublet pulse for a plurality of pairs of doublet optical pulse radar signals in substantially equal time segments over a predetermined time period so as to reduce translational velocity error of a detected target and thereby improve a target detection characteristic of the radar system following reception of return pairs of doublet pulse signals;
   transmitting and receiving the plurality of pairs of doublet optical pulse radar signals to and from a target; and
   detecting and processing return signals of the transmitted pairs of doublet optical pulse radar signals so as to provide an indication not only of range and velocity but also motion, including translation and rotation of the target.

2. The method of claim 1 wherein said optical pulse signals comprise laser pulse signals and wherein the reference pulse and doublet pulse of any of said plurality of doublet pairs are exclusively coherent to each other relative to the relative coherency of the other pairs of doublet pulse signals.

3. The method of claim 2 wherein the step of varying the spacing comprises linearly modulating the spacing between the reference pulse and the doublet pulse of said doublet pulse signal.

4. The method of claim 1 wherein the reference pulse of a predetermined number of said plurality of pairs of doublet pulse signals is substantially stationary relative to the respective doublet pulse.

5. The method of claim 4 wherein the reference pulse of all of said plurality of pairs of doublet pulse signals is substantially stationary relative to the respective doublet pulse during any modulation time period.

6. The method of claim 5 wherein at least one doublet pulse of said plurality of pairs of doublet pulse signals precedes a respective reference pulse thereof.

7. The method of claim 5 wherein at least one doublet pulse of said plurality of pairs of doublet pulse signals follows a respective reference pulse.

8. The method of claim 5 wherein the doublet pulse of a predetermined number of said plurality of doublet pulse signals precede a respective reference pulse in successive smaller spacing increments and the doublet pulse of another predetermined number of doublet pulse signals follows a respective reference pulse in successive large spacing increments.

9. The method of claim 3 wherein multiple doublet pulse pairs of a sequence of said linearly modulated plurality of doublet pulse signals have substantially the same spacing between the reference pulse and the doublet pulse.

10. A doublet pulse optical radar system, comprising:
    signal generator means generating pairs of doublet optical radar pulse signals of electromagnetic energy, each of said pairs of doublet optical pulse signals including a reference pulse and a doublet pulse spaced apart in time relative to the reference pulse; and means for varying the spacing between the reference pulse and the respective doublet pulse for a plurality of pairs of doublet optical pulse radar signals in substantially equal time increments over a predetermined time period so as to improve a target detection characteristic of the radar system following reception of return pairs of doublet pulse signals;

means for transmitting and receiving the plurality of pairs of doublet optical pulse radar signals to and from a target; and means for detecting and processing return signals of the transmitted pairs of doublet pulse optical radar signals so as to provide an indication not only of range and velocity but also motion, including translation and rotation of the target.

11. The system of claim 10 wherein the means for varying the spacing comprises means for varying the spacing between the reference pulse and the doublet pulse of said pairs of doublet pulse radar signals.

12. The system of claim 10 wherein the means for varying the spacing comprises means for linearly modulating the spacing of time between the reference pulse and the respective doublet pulse of said doublet pulse optical radar signals.

13. The system of claim 12 wherein said pairs of doublet pulse optical radar signals comprise laser radar pulse signals.

14. A doublet pulse laser radar system, comprising:

a first source of laser signals;

a second source of laser signals offset in frequency from the first source of laser signals;

a reference laser pulse generator and a doublet laser pulse generator connected to the first source of laser signals;

a synchronizer circuit connected to both said laser pulse generators for modulating the spacing between the reference pulse and the doublet pulse of sequential doublet pairs of laser pulse signals outputted therefrom;

a signal combiner circuit connected to both laser pulse generators for combining the reference pulse and doublet pulse of each pair of said laser pulse signals and feeding the doublet pairs of laser pulse signals to a transmit/receive switch circuit;

a laser pulse transmitting and receiving device connected to the transmit/receive switch;

a first optical signal mixer including a pair of inputs respectively connected to the transmit/receive switch circuit and the second source of laser signals and providing a first heterodyned output of received doublet pairs of laser pulse signals transmitted to a target;

a first photo-detector connected to the output of the first optical signal mixer and providing an output of RF reference and doublet pulse pairs of received signals;

a second optical signal mixer including a pair of inputs respectively connected to the signal combiner circuit and the second source of laser signals and providing a second heterodyned output of monitor doublet pulses;

a second photo-detector connected to the output of the second optical signal mixer and providing an output of pairs of RF monitor reference and doublet pulse pairs a circuit connected to the outputs of the first and second photo-detectors for amplifying and combining the RF doublet pairs of the received signals and the RF monitor pulses for signal processing;

an analog to digital signal converter connected to the circuit for amplifying and combining and providing digital signals at the output thereof for signal processing; and a signal processor connected to the analog to digital signal converter for processing the digital signals so as to provide an indication of range velocity and motion of a target radiated by pairs of laser pulse signal pairs including modulated pairs of reference pulse and doublet pulse signals.

15. The laser radar system of claim 13 wherein the synchronizer linearly modulates the spacing between the reference pulse and the doublet of the pairs of doublet laser pulse signals.

16. The laser radar system of claim 15 wherein multiple doublet pulse pairs of a sequence of said linearly modulated plurality of doublet pulse signals have substantially the same spacing between the reference pulse and the doublet pulse.

17. The laser radar system of claim 15 wherein at least one doublet pulse of said plurality of pairs of doublet pulse signals precedes a respective reference pulse thereof; and wherein at least one doublet pulse of said plurality of pairs of doublet pulse signals follows a respective reference pulse.

18. The laser radar system of claim 15 wherein the doublet pulse of a predetermined number of said plurality of doublet pulse signals precede a respective reference pulse in successive smaller spacing increments and the doublet pulse of another predetermined number of doublet pulse signals follows a respective reference pulse in successive large spacing increments.

* * * * *